United States Patent

Alpers

[15] 3,699,380

[45] Oct. 17, 1972

[54] AUTOMATIC BORESIGHTING CIRCUIT

[72] Inventor: Frederick C. Alpers, Riverside, Calif.

[73] Assignee: The United States of America as represented by the Secretary of the Navy

[22] Filed: April 17, 1964

[21] Appl. No.: 361,613

[52] U.S. Cl. ......................315/21 R, 178/6.8, 315/26

[51] Int. Cl. ..............................................H01j 29/70

[58] Field of Search.....178/6.8, 7.7, 7.83, 7.84, 7.50, 178/7.82, 7.5 R; 315/19, 21 R, 24

[56] References Cited

UNITED STATES PATENTS

| | | | |
|---|---|---|---|
| 3,182,224 | 5/1965 | Stone et al. | 315/21 |
| 3,210,597 | 10/1956 | Siegmund et al. | 315/21 |
| 3,389,294 | 6/1968 | Shaw | 315/19 |

*Primary Examiner*—Richard A. Farley
*Attorney*—J. M. St. Amand, T. M. Phillips, R. S. Sciascia and P. N. Critchlow

EXEMPLARY CLAIM

1. In an automatic boresighting circuit for use in an electro-optical guidance system, the combination comprising:

a. a television type imaging tube for scanning a target to be tracked,
b. means on the face of said imaging tube defining a rectangular area which is smaller than the area of the face of said tube,
c. sweep circuit means for scanning said rectangular area of said imaging tube,
d. sensing means affixed to the face of said imaging tube for sensing when the scanning action scans on the area outside said rectangular area,
e. control circuit means coupled to said sensing means and to said sweep circuit means for maintaining said scanning within said rectangular area, said control circuit including:
f. a first sawtooth wave generator for generating a vertical sweep voltage,
g. a vertical deflection amplifier coupled to said first sawtooth wave generator and to said imaging tube for controlling the amplitude of the vertical deflection voltage applied to said imaging tube.
h. a first gated amplifier having a first input coupled to the output of said sensing means, a second input coupled to said vertical sweep voltage generator and having an output,
i. a rectifier circuit coupling the output of said first gated amplifier to said vertical deflection amplifier for controlling the gain of said deflection amplifier,
j. a second gated amplifier having a first input coupled to the output of said sensing means, a second input coupled to said vertical sweep voltage generator and having an output,
k. a rectifier circuit coupling the output of said second gated amplifier to the output of said vertical deflection amplifier for supplying a dc voltage component to said vertical deflection voltage for moving the whole raster up or down.
l. a second sawtooth wave generator for generating a horizontal sweep voltage,
m. a horizontal deflection amplifier coupled to said second sawtooth wave generator and to said imaging tube for controlling the amplitude of the horizontal deflection voltage applied to said imaging tube,
n. a third gated amplifier having a first input coupled to the output of said sensing means, a second input coupled to said second sawtooth wave generator and having an output,
o. a rectifier circuit coupling the output of said third gated amplifier to said horizontal deflection amplifier for controlling the gain of said deflection amplifier,
p. a fourth gated amplifier having a first input coupled to the output of said sensing means, a second input coupled to said horizontal sweep voltage generator and having an output,
q. a rectifier circuit coupling the output of said fourth gated amplifier to the output of said horizontal deflection amplifier for supplying a dc voltage component to said horizontal deflection voltage for moving the whole raster to the right or left.

2 Claims, 4 Drawing Figures

FREDERICK C. ALPERS
INVENTOR

BY

ATTORNEYS

FREDERICK C. ALPERS
INVENTOR.

BY [signature]
[signature]
ATTORNEYS

AUTOMATIC BORESIGHTING CIRCUIT

The invention herein described may be manufactured and used by or for the Government of the United States of America for governmental purposes without the payment of any royalties thereon or therefor.

The general purpose of this invention is to eliminate errors which accumulate in electro-optical or television guidance systems, and thereby to increase the accuracy with which these systems function in missile guidance, bombing or fire-control application.

Electro-optical guidance system is defined as a device which utilizes light from a target scene, a lens, a sensor or imaging tube, and associated electronic signal processing circuitry to derive guidance information. A typical type of electro-optical guidance system is the television guidance system wherein an electronic image of the target scene is formed by a television camera carried in a missile or drone aircraft, and the electronic information is relayed to a remote operator who uses a display formed by this information in command guiding the missile to impact with the target. The electro-optical system is a broader category than a television system in that in certain electro-optical systems the information may never be transmitted but may be used within the missile to perform guidance automatically without benefit of a televised display or human operator.

In the prior art the usual technique for determining the direction of the target involves installing the television or electro-optical imaging system in its place and aligning it mechanically and electronically so that the center of the image points in a particular direction. This operation is called boresighting. In the past errors have arisen to some extent from the method of boresighting and also from subsequent variations which caused the raster of the imaging system to change size or become oriented in a slightly different position than it had at the time of the initial boresighting. These variations can come about due to slight variations in the voltage of the power supplied to the system, variations in temperature, variations in amplifier gain due to deterioration of cathodes and/or gas in tubes, and other such variations which are beyond practical control of the electro-optical system designer.

Assume that an electro-optical system has a field of view of 30° in the horizontal direction, but due to variations effecting the imaging tube in particular or the amplifiers which deflect it, there is a 5 percent shift in the particularly 30° field which is covered. That is, the image formed on the face of the imaging tube is shifted over by 5 percent from the position it occupied when the system was initially boresighted. This means a 1.5° error in boresight has accumulated. If the missile speed, the response capability of the servos, the expansion of the target as the range is decreased, and the blurring of the image due to relatively fast motion of the target at the end of the picture are all taken into account, there will be an effect which prohibits any guidance information from being used in the very last portion of the flight, which might mean that the missile must fly without corrective guidance for, say, the last 500 feet of flight. The 1.5° error at the time of last effective guidance correction would result in a 26 mil error in the direction in which the missile was guided, and this in turn, at 500 feet, means a miss-distance of 13 feet due to boresight error alone; accordingly:

An object of the present invention is to provide an automatic boresighting circuit which, with reference to the total field of view, will maintain boresight accuracy within less than 1 percent of the initial boresight alignment.

Another object of the invention is to provide a boresighting circuit which will maintain initial alignment regardless of fluctuations in circuit parameters.

A further object of the invention is to provide an automatic boresighting circuit which automatically cancels out the effects on the boresight alignment by fluctuations in amplifier gain, voltage, etc.

Other objects and many of the attendant advantages of this invention will become readily appreciated as the same becomes better by reference to the following detailed description when considered in connection with the accompanying drawings wherein.

Figure 1:
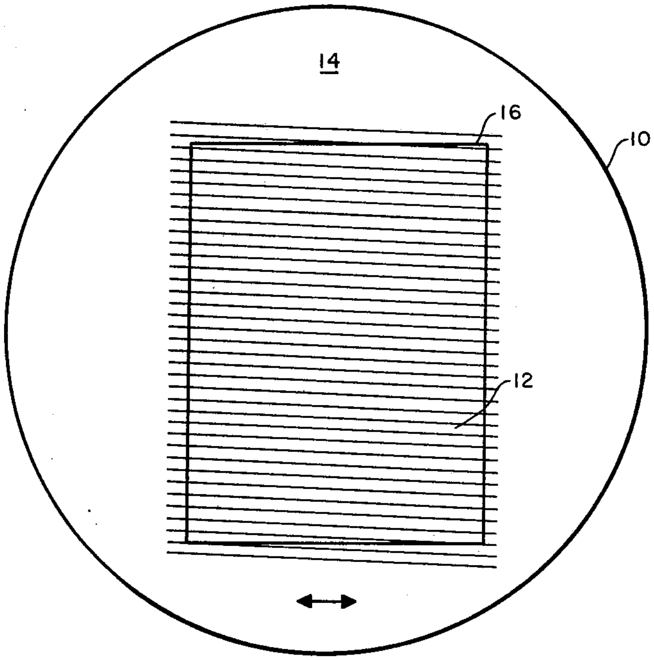
FIG. 1 shows one principle of the invention applied to the front of a television type imaging tube.

Referring now to FIG. 1 there is shown on the front of an imaging tube 18 (FIG. 2) a raster 12 which is formed by the usual action of deflecting a beam in such a manner that it scans over only a portion of the face plate 10 of imaging tube 18. A mask 14 having a cutout portion 16 is placed over face plate 10. Mask 14 with the rectangular hole 16 divides face plate 10 of imaging tube 18 into an outer masked area and an inner or unmasked area. Raster 12 is adjusted to extend beyond the masked area on all four edges as shown in FIG. 1. Mask 14 may be adjusted up and down and right and left to bring raster 12 into the center of the rectangular opening 16 for initial alignment. In the construction of an electro-optical system employing the present invention, the imaging tube would be mounted at the factory and mask 14 aligned so that the center of the unmasked area or raster 12 corresponds direct with the longitudinal axis of the guidance system in which this circuit is employed.

Figure 2:
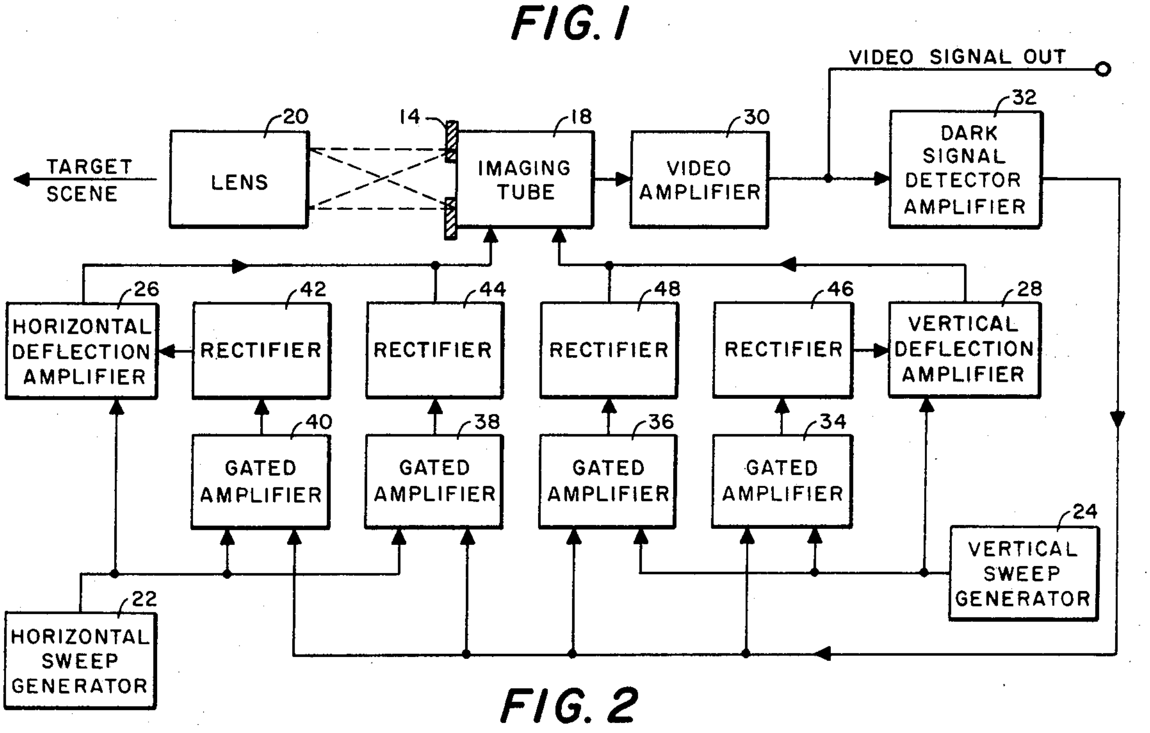
FIG. 2 is a block diagram of one embodiment of the invention.

Referring now to FIG. 2 there is shown an imaging tube 18 scanning a target scene focused on the imaging tube by a lens system 20. Imaging tube 18 functions in the usual manner and is scanned horizontally and vertically through the action of conventional deflection circuits consisting of sweep generators 22 and 24 and amplifiers 26 and 28 respectively. A video signal is derived from the face plate of imaging tube 18 and is fed to video amplifier 30 which provides the video signal output for relay to a display unit and observation by a remote pilot or operator. The video signal output of amplifier 30 is also fed to a dark signal detector/amplifier combination 32. The purpose of dark signal detector 32 is to detect when the beam is scanning behind the mask and when it is scanning in the open portion 16. When the scanning action is such that the beam is traversing a portion of the masked area of face plate 10, a signal signifying a dark area of the raster appears in the output of video amplifier 30. The output of dark signal detector/amplifier 32 is fed to a plurality of gated amplifiers 34, 36, 38 and 40. A second input is coupled to gated amplifiers 34 and 36 from vertical sweep generator 24, while a second input is coupled to gated amplifiers 38 and 40 from horizontal sweep generator 22. The output from gated amplifier 40 is detected by rectifier 42 and fed as a second input to horizontal deflection amplifier 26. The output of gated amplifier 38 is detected by rectifier 44 and is added to the output signal from horizontal deflector amplifier 26. The output of gated amplifier 34 is detected by rectifier 46 and is fed to vertical deflection amplifier 28. The output of gated amplifier 36 is detected by rectifier 48 and is added to the output signal from vertical deflection amplifier 28.

The operation of the system of FIG. 2 is as follows: When a signal appears at the output of dark signal detector/amplifier 32, one condition necessary for the operation of all four gated amplifiers, 34, 36, 38 and 40, is satisfied. However, a second condition which is likewise necessary for operation of each of the four amplifiers 34, 36, 38 and 40 is that a signal be present to indicate that the beam is then scanning near the particular edge of the sweep with which a given amplifier is associated. Such signals to indicate where the beam is scanning are supplied to gated amplifiers 34 and 36 from the vertical sweep generator 24, and to gated amplifiers 38 and 40 from the horizontal sweep generator 22. Gated amplifier 38 is thus connected with signal biases and polarities arranged to cause an output to appear only when both a dark signal is present and the sawtooth voltage is at a level associated with the early or left-hand side of the sweep. When a dark signal occurs at the start of the sweep during the interval that the beam is scanning behind the edge of the mask 14 (as is the situation shown at the left-hand edge of raster 12 in FIG. 1), there is an output from gated amplifier 38, and the duration of this output depends on the length of the portion of the beam trace which lies behind mask 14. Such an output occurs for each sweep line so long as a portion of the trace extends behind mask 14. These gated amplifier outputs are detected by rectifier 44 and the d-c level of its output is proportional to the pulse width output of gated amplifier 38, which in turn is proportional to the amount by which raster 12 overlaps mask 14 along the left edge. The d-c output from rectifier 44 is then used to control the horizontal centering of raster 14 on imaging tube face plate 10. Use of a d-c voltage for centering purposes is conventional; the d-c is mixed with the a-c signal from horizontal deflection amplifier 26 and then is applied to imaging tube 18. That is, the output from rectifier 44 will move the whole raster to the left or right by supplying a d-c component to the horizontal deflection amplifier 26, and by choosing the proper polarities and voltage levels the proper duration or desired duration of raster 12 underneath mask 14 may be accomplished.

Referring now to gated amplifier 40 and rectifier 42, gated amplifier 40 is biased so that it will have an output only when the horizontal sweep generator 22 is near the tail end of the sweep. That is, amplifier 40 is gated on by high values of input signals from the horizontal sweep generator 22 whereas gated amplifier 38 was set to operate at the low or beginning portion of the sweep signal. The output from gated amplifier 40 is detected by rectifier 42 and fed to horizontal deflection amplifier 26 as the gain control voltage. The amplitude of the output of horizontal deflection amplifier is then controlled by the detected signal from rectifier 42, which thereby controls the length of raster 12 in the right-left direction. If the length of raster 12 is too long, more raster will lie behind mask 14 and the right side of imaging tube 18, resulting in a long duration dark signal at the output of dark signal detector/amplifier 32 during the period when amplifier 40 is in operation. The long dark signal will then feed back through gated amplifier 40 and rectifier 42 to reduce the gain of horizontal deflection amplifier 26 and therefore reduce the width of raster 12. If the opposite situation occurs, that is, if raster 12 is too short, there will be very little or no dark signal at the end of the sweep, and as a result no dark will appear at the output of amplifier 32, and this will cause the output of rectifier 42 to disappear and thereby increase the gain of horizontal deflection amplifier 26 until raster 12 again is large enough to overlap with mask 14 and a balance is obtained.

In a similar manner gated amplifiers 34, 36 and rectifiers 46 and 48 will keep the top and bottom respectively of raster 12 overlapping a small portion of mask 14. In the vertical centering action the dark signals from detector/amplifier 32 may last for several entire lines of horizontal sweep, but the integrated effect of these several long signals in rectifiers 46 and 48 will be the same as the effect of many short signals in rectifiers 42 and 44 in the horizontal case. The overall action is then that despite any voltage changes, changes in the imaging tube or deflection amplifier characteristics, drifts due to temperature or the like, raster 12 is locked to maintain automatically a centered or known position with respect to the mechanical position of the mask 14 on face plate 10. This automatic and precision control of the raster position, together with use of stable compounds in the sweep generators and deflection amplifiers which generate the raster, will cause the boresighting of the electro-optical system to be maintained at the boresight position initially set in by precision alignment at the factory.

Figure 3:
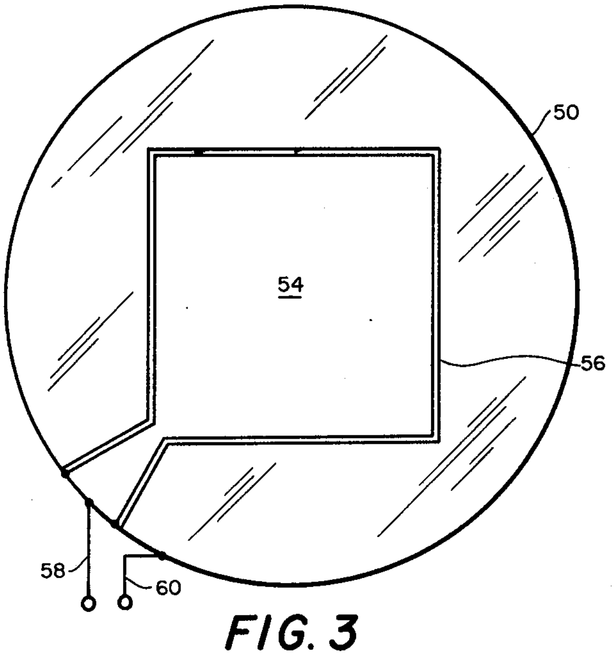
FIG. 3 shows a second principle of the invention applied to the front of a television type imaging tube.
Figure 4:
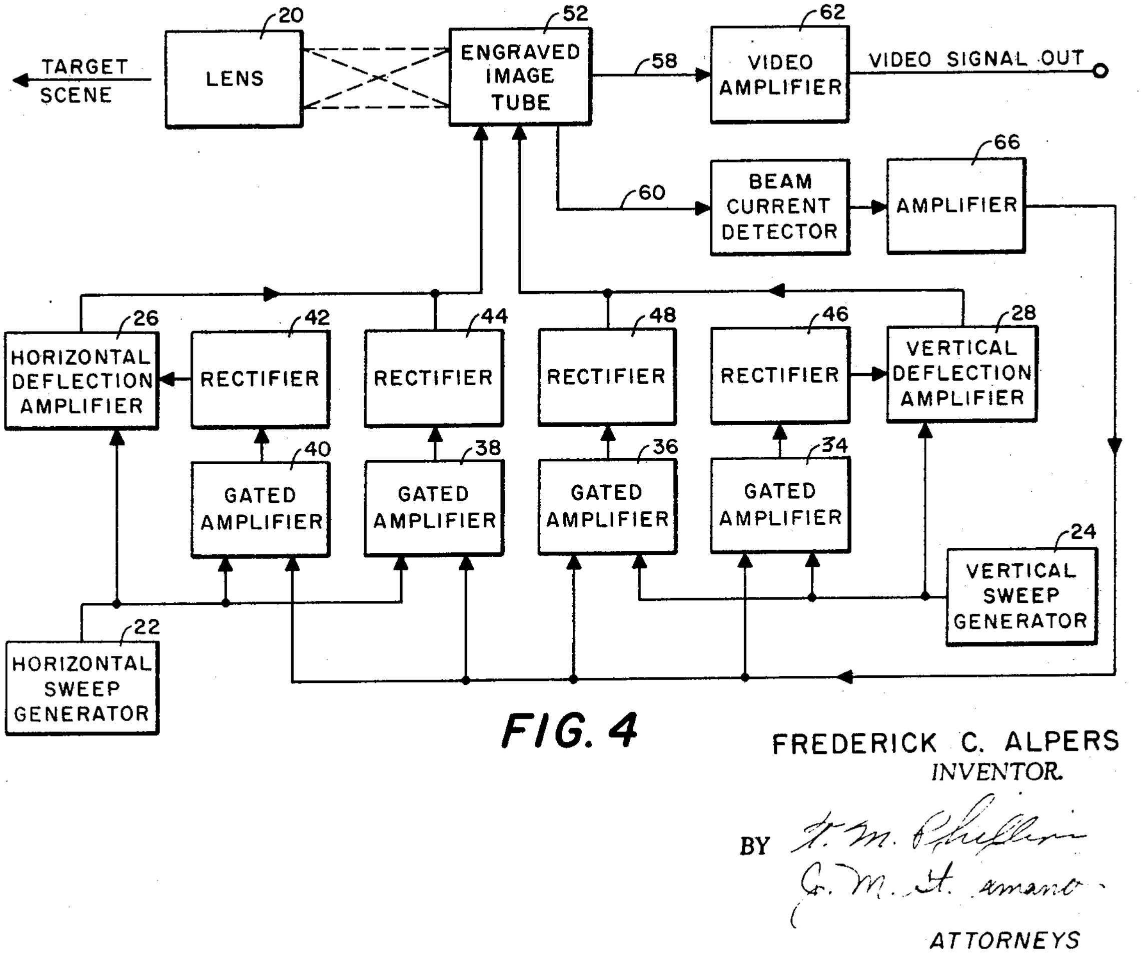
FIG. 4 shows a block diagram of another embodiment of the invention.

In the embodiment shown in FIG. 3 the face plate of the imaging tube 50 is engraved by etching away a narrow channel 52 of the face plate material to separate an inner rectangular area 54 and an outer peripheral portion 56. Conducting leads 58 and 60 are connected to the two face plate portions 54 and 56 to provide respectively one video signal which is amplified in video amplifier 62 and a second video signal which is fed to beam current detector 64. With this arrangement video amplifier 62 will supply a video signal output 68 for use in the conventional display manner during a major portion of the raster scanning process, while beam current detector 64 will detect the beam any time it moves into the peripheral area 56 which defines the borders within which the raster is to be centered. The output signal from beam current detector 64 is amplified in amplifier 66 and is coupled as an input to gated amplifiers 30, 34, 36, 38 and 40. The remainder of the circuit functions in exactly the same manner as the circuitry described with FIG. 2. The etched channel 52 on the face plate of special imaging tube 50 (as contrasted with conventional imaging tube 18 which lacks this etching) thus serves to provide a boresighting control output signal 60 without the use of a mask 14 as was required in the embodiment previously described.

Obviously many modifications and variations of the present invention are possible in the light of the above teachings. It is therefore to be understood that within the scope of the appended claims the invention may be practiced otherwise than as specifically described.

What is claimed is:

1. In an automatic boresighting circuit for use in an electro-optical guidance system, the combination comprising:

a. a television type imaging tube for scanning a target to be tracked, b. means on the face of said imaging tube defining a rectangular area which is smaller than the area of the face of said tube, c. sweep circuit means for scanning said rectangular area of said imaging tube, d. sensing means affixed to the face of said imaging tube for sensing when the scanning action scans on the area outside said rectangular area, e. control circuit means coupled to said sensing means and to said sweep circuit means for maintaining said scanning within said rectangular area, said control circuit including:

f. a first sawtooth wave generator for generating a vertical sweep voltage, g. a vertical deflection amplifier coupled to said first sawtooth wave generator and to said imaging tube for controlling the amplitude of the vertical deflection voltage applied to said imaging tube.

h. a first gated amplifier having a first input coupled to the output of said sensing means, a second input coupled to said vertical sweep voltage generator and having an output, i. a rectifier circuit coupling the output of said first gated amplifier to said vertical deflection amplifier for controlling the gain of said deflection amplifier, j. a second gated amplifier having a first input coupled to the output of said sensing means, a second input coupled to said vertical sweep voltage generator and having an output, k. a rectifier circuit coupling the output of said second gated amplifier to the output of said vertical deflection amplifier for supplying a dc voltage component to said vertical deflection voltage for moving the whole raster up or down, l. a second sawtooth wave generator for generating a horizontal sweep voltage, m. a horizontal deflection amplifier coupled to said second sawtooth wave generator and to said imaging tube for controlling the amplitude of the horizontal deflection voltage applied to said imaging tube, n. a third gated amplifier having a first input coupled to the output of said sensing means, a second input coupled to said second sawtooth wave generator and having an output, o. a rectifier circuit coupling the output of said third gated amplifier to said horizontal deflection amplifier for controlling the gain of said deflection amplifier, p. a fourth gated amplifier having a first input coupled to the output of said sensing means, a second input coupled to said horizontal sweep voltage generator and having an output, q. a rectifier circuit coupling the output of said fourth gated amplifier to the output of said horizontal deflection amplifier for supplying a dc voltage component to said horizontal deflection voltage for moving the whole raster to the right or left.

2. The circuit of claim 1 wherein said means for defining said rectangular area is a rectangle etched on the face of said imaging tube.

* * * * *